April 20, 1954      E. A. SILZLE      2,675,842
APPARATUS FOR SCOOPING CITRUS PEEL
Filed Dec. 12, 1949      3 Sheets-Sheet 1

EARL A. SILZLE,
INVENTOR.

BY *Lyon & Lyon*

ATTORNEYS

April 20, 1954   E. A. SILZLE   2,675,842
APPARATUS FOR SCOOPING CITRUS PEEL
Filed Dec. 12, 1949   3 Sheets-Sheet 2

EARL A. SILZLE,
INVENTOR.

BY *Lyon & Lyon*
ATTORNEYS

April 20, 1954     E. A. SILZLE     2,675,842
APPARATUS FOR SCOOPING CITRUS PEEL
Filed Dec. 12, 1949     3 Sheets-Sheet 3

EARL A. SILZLE,
INVENTOR.

BY Lyon & Lyon
ATTORNEYS

Patented Apr. 20, 1954

2,675,842

UNITED STATES PATENT OFFICE 2,675,842

APPARATUS FOR SCOOPING CITRUS PEEL

Earl A. Silzle, Anaheim, Calif.

Application December 12, 1949, Serial No. 132,550

7 Claims. (Cl. 146—3)

This invention relates to apparatus for scooping citrus peel.

In the manufacture of marmalade, preserves, candied peel, etc. from citrus peel and in the preparation of citrus peel products used in flavoring, the conventional practice is to remove the pulp or "rag" of the peel shell after the juice has been removed from half of a fruit. The removal of unwanted material after the juicing operation has customarily been performed by hand, and such work is slow, tedious and costly. The "rag" remaining within the peel half shell after the juicing operation generally comprises portions of the section coverings which originally surrounded the juice sacs in the whole fruit, together with portions of the central bundle of fibers which normally extend through the fruit axially from the stem end to the blossom end. The rag may also include certain of the juice sacs which remain after the major portion of the juice is extracted. In the manufacture of marmalade, preserves, candied peel, etc. it is desirable to remove all of the rag but to leave as much of the albedo as possible. In the manufacture of flavorings such as, for example, lemon rind flavoring, it may be desirable to remove part of the albedo as well.

It is a particular object of this invention to provide improved apparatus for scooping citrus peel.

Another object is to provide a device employing a rotary cutter adapted to extend into the peel half shell, together with a feed wheel gripping the exterior surface of the half shell to progress the shell over the rotating cutter.

Another object is to provide a novel form of feed wheel.

Another object is to provide a cup-shaped rotary cutter.

Another object is to provide a novel form of guide which assists in progressing the shell with respect to the rotating cutter and which acts as a guard to prevent accidental injury to the fingers of an operator.

Another object is to provide a deragging device for citrus peel in which a rotary cutter is adjustably mounted for movement with respect to a rotary feed wheel.

Other objects and advantages will appear hereinafter.

Figure 1:
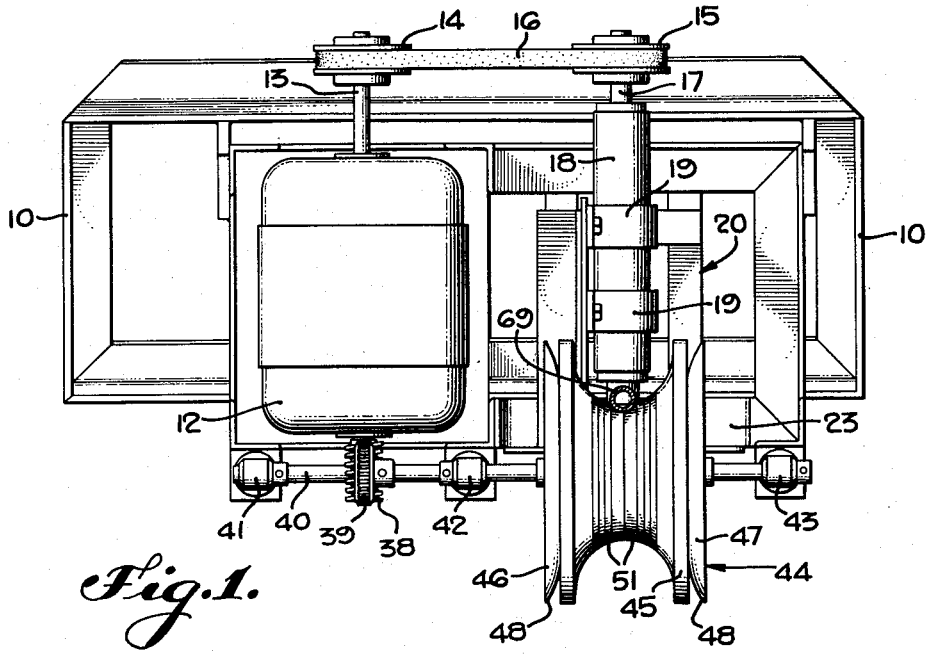
Figure 1 is a top plan view of a preferred embodiment of my invention.

Referring to the drawings, the base 10 rests on a suitable support 11 and is adapted to support an electric motor 12. The motor shaft 13 extends from both ends of the motor housing and on one end is provided a driving pulley 14 adapted to turn a driven pulley 15 by means of a V belt 16. The driven pulley 15 is carried on a spindle 17 rotatably mounted in suitable bearings (not shown) provided in the housing 18. The bearing housing 18 is not mounted directly on the frame 10, but on the contrary is fastened by means of clips 19 to a carrier frame 20. The carrier frame 20 is pivotally supported by means of the pivot bolts 21 which extend through downwardly projecting ears 22 fixed on the base 10. A U shaped member 23 fixed on the base 10 forms a stationary abutment for the lower end of the expansion coil spring 24.

Figure 4:
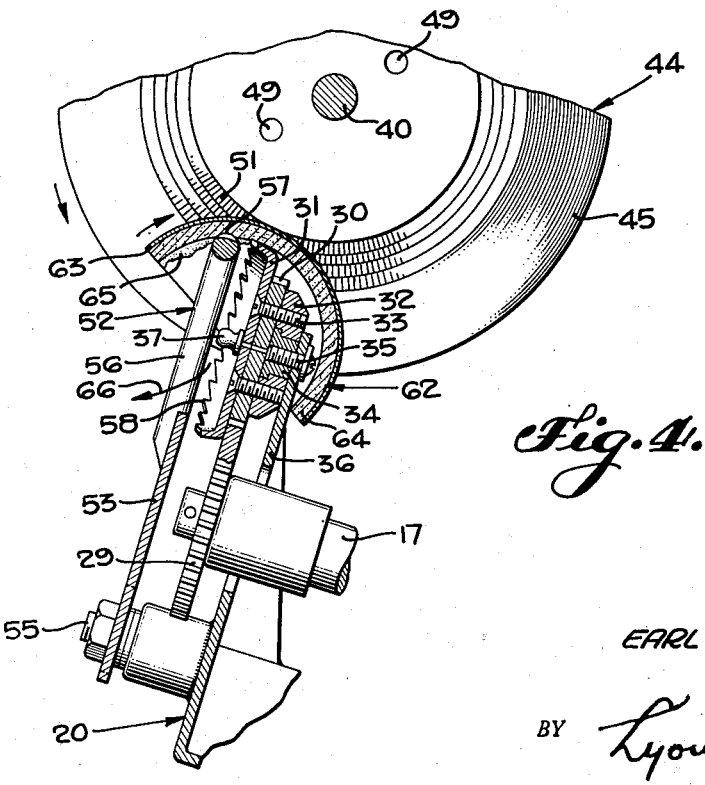
Figure 4 is a sectional view taken on the middle plane of the feed wheel and showing the cooperative action of the rotary cutter guard and feed wheel.
Figure 3:
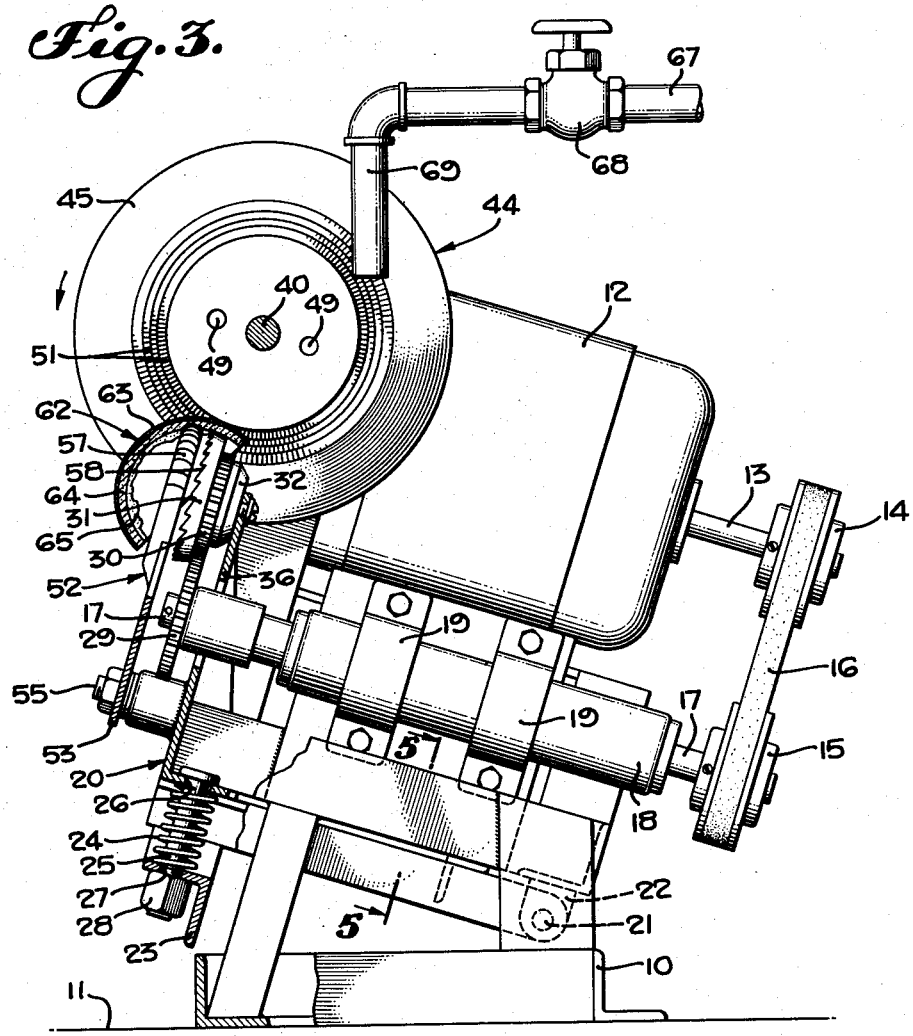
Figure 3 is a side elevation partly in section.
Figure 6:
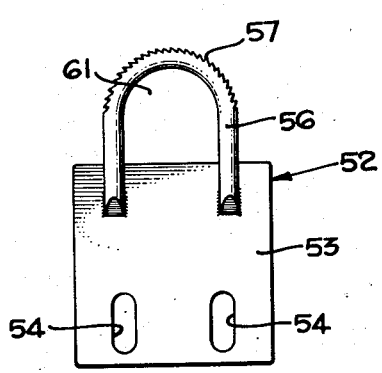
Figure 6 is a front elevation of the guard.

A bolt 25 extends through the spring 24 and through apertures 26 and 27 provided in the carrier frame 20 and member 23 respectively. The spring 24 acts resiliently to move the carrier frame in a clockwise direction about the pivot bolts 21 as viewed in Figure 3, and this action is limited by the bolt 25 and its cooperating nut 28. Turning of the nut on the bolt serves to adjust the relative angular position of the carrier frame 20. A driving gear 29 is fixed on the forward end of the spindle 17 and meshes with a driven gear 30 which is connected to drive the rotary cutter 31. As clearly shown in Figure 4 the rotary cutter 31, gear 30 and collar 32 are connected by screws 33 so that the parts rotate as a unit. A stationary bearing sleeve 34 is supported in position by means of the threaded element 35 which is in turn supported on the upper end of the bracket 36 mounted at the forward end of the carrier frame 20. A suitable lubricating fitting 37 may be provided for introducing lubricant under pressure through the rotary cutter 31 and gear 30 so that it may find its way to the bearing surfaces provided between the collar 32 and the stationary bearing 34. From the above description it will be understood that the rotation of the motor shaft 13 serves to drive the spindle 17, gears 29 and 30, and the rotary cutter 31.

A worm pinion 38 fixed on the forward end of the motor shaft 13 is arranged to drive the worm wheel 39 fixed on the feed shaft 40. Suitable supporting bearings 41, 42 and 43 are mounted on the base 10 and are adapted to rotatably support the feed shaft 40. Fixed on the feed shaft 40 between the bearings 42 and 43 is a feed wheel assembly generally designated 44. This assembly includes a pair of duplicate resilient halves cooperating to form the central grooved wheel 45, together with a pair of non-resilient flanges 46 and 47 which are flared axially away from the wheel 45 as shown at 48. Axially extending pins 49 may be provided on the flanges 46 and 47, and these pins are received within suitable holes 50 provided in the resilient feed wheel 45. The surface of the wheel 45 may be roughened as shown at 51.

Figure 2:
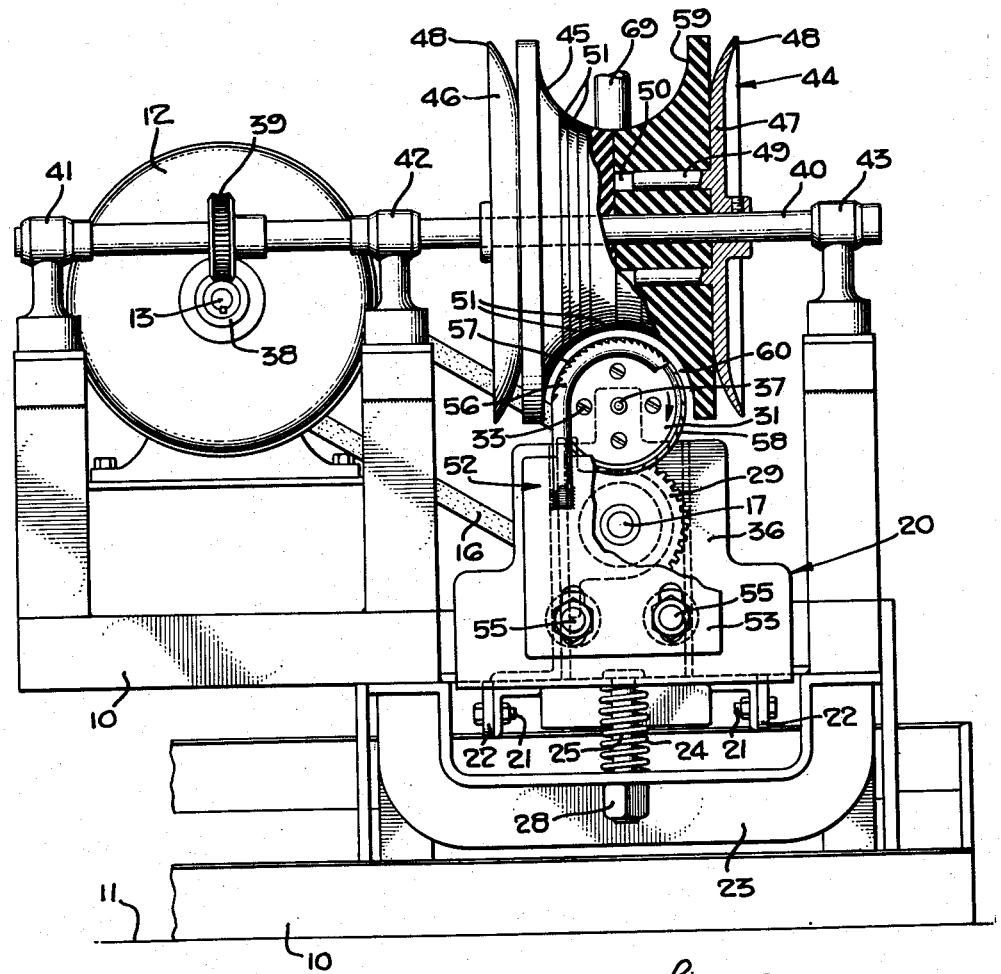
Figure 2 is an end elevation thereof, certain parts being shown in section.
Figure 5:
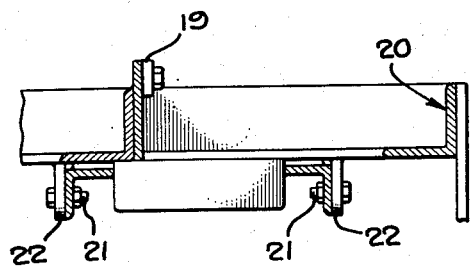
Figure 5 is a sectional detail taken substantially on the lines 5—5 as shown in Figure 3.

The grooved center of the feed wheel 45 is such that the rotary cutter 31 extends into the groove. The cutter 31 preferably rotates on an axis which is at right angles but does not intersect the axis of the feed shaft 40. A guard generally designated 52 is provided with a base portion 53 having a pair of slots 54 through which may extend clamping bolts 55. The bolts 55 are mounted on the carrier frame 20. The horseshoe-shaped extension 56 secured to the base portion 53 extends upwardly into a position closely adjacent the upper portion of the rotary cutter 31. Serrations 57 may be provided on the outer curved portion of the extension 56, and these serrations preferably slant in a direction opposite to the slant of the teeth 58 formed on the rim of the cutter 31. As shown clearly in Figure 2, the cutter 31 and the groove 59 of the feed wheel 45 cooperate to define an arcuate opening 60. The upper curved portion 56 of the guard 52 follows the outline of the cutter and does not obstruct the opening 60. It will be noted that a central aperture 61 is formed within the horseshoe-shaped portion 56 of the guard.

The half shell 62 of a citrus fruit such as, for example, an orange or a lemon from which the juice has been previously extracted is manually positioned on the guard so that it extends into the gap 60. As clearly shown in Figure 4, the grooved surface of the feed wheel 45 grips the flavedo 63 or outer surface of the half shell 62. The cutter teeth 58 cut into the inner white layer or albedo 64 and scoop out the section coverings, central bundle, etc. within the albedo which is generically termed the rag 65. The feed wheel assembly 44 revolves slowly so that the half section 62 is progressed over the rotating cutter 31. The teeth 58 remove all of the rag 65 and as much of the albedo 64 as desired. The bolt 25 and nut 28 provide an adjustment for moving the cutter 31 toward and away from the feed wheel assembly 44 so that an accurate adjustment is provided for the desired thickness of the albedo. The serrations 57 in the guard 56 assist the roughened portion 51 of the feed wheel 45 in preventing the citrus half shell from turning with the cutter 31.

It will be noted that the cutter 31 is cup-shaped and the bottom flange thereof is fixed to the gear 30, while the forwardly directed rim is provided with the teeth 58 on the outer edge. As the rag and portion of the albedo are removed from the half shell by the action of the cutter teeth this material is deflected toward the center of the rotating cutter 31 and returns forwardly through the aperture 61 in the guard 52 in a direction shown by the arrow 66. This material which has been removed falls down the face of the guard portion 53 and is collected in any suitable way. The half shell turns about the cutter, and this motion occurs about a major diameter of the half shell. After the half shell has passed completely through the gap 60 it also falls into a suitable container or onto a moving conveyor (not shown).

A water pipe 67 having a flow control valve 68 is adapted to deliver a stream of water against the backside of the feed wheel 45 via the nozzle 69. This serves to keep the roughened portions of the wheel groove clear of bits of rag, peel, etc. and insures optimum contact of the feed wheel and citrus half shells. Considerable variation in size of fruit is permissible since the resilient walls of the feed wheel permit relatively large fruit half shells to pass over the cutter. The spring 24 also allows the cutter to move away from the feed wheel in order that large fruit may be processed. In order that a single machine may be used effectively on lemons, oranges and grapefruit, however, it is necessary to provide feed wheels and corresponding cutters and guards for each of these species of citrus fruit.

Having fully described my invention, it is to be understood that I do not wish to be limited to the details herein set forth, but my invention is of the full scope of the appended claims.

I claim:

1. In a device for scooping the interior of a substantially hemispherical citrus peel shell, the combination of a feed wheel having a circumferential groove in its radially outer surface shaped to grip the exterior surface of the shell, a rotary cutter adapted to extend into the groove, drive means for said rotary cutter extending therewith into said groove, the axes of rotation of the feed wheel and cutter being at substantially right angles but not intersecting, the rotary cutter having peripheral cutting teeth defining a plane passing approximately through the axis of said feed wheel.

2. In a device for scooping the interior of a substantially hemispherical citrus peel shell, the combination of a resilient feed wheel having a circumferential groove in its outer periphery shaped to grip the exterior surface of the shell, a rotary cutter adapted to extend into the groove, the rotary cutter having peripheral cutting teeth defining a plane passing approximately through the axis of said feed wheel, the axes of rotation of the feed wheel and cutter being at substantially right angles but not intersecting the rotary cutter having peripheral cutting teeth defining a plane passing approximately through the axis of said feed wheel, the feed wheel and cutter cooperating to define an arcuate opening through which the peel shell may be progressed.

3. In a device for scooping the interior of a portion of the shell of a citrus fruit, the combination of a rotary cutter adapted to enter the shell, the cutter having an annular rim and forwardly projecting teeth on its rim, a guard member positioned adjacent to and in advance of the cutter teeth and having its upper portion curved to conform to the outline of the cutter, the guard member having an opening through which may pass rag material removed from the shell by the rotary cutter.

4. In a device for scooping the interior of a portion of the shell of a citrus fruit, the combination of a rotary cutter adapted to enter the shell.

the cutter having an annular rim and forwardly projecting teeth on its rim, a guard member positioned in advance of the cutter teeth and having its upper portion curved to conform to the outline of the cutter, said upper portion having teeth slanting in a direction opposite to the direction of rotation of the cutter.

5. In a device for scooping the interior of a portion of the shell of a citrus fruit, the combination of a rotary cutter adapted to enter the shell, the cutter having an annular rim and forwardly projecting teeth on its rim, a guard member positioned in advance of the cutter teeth and having its upper portion curved to conform to the outline of the cutter, the guard member having an opening through which may pass rag material removed from the shell by the rotary cutter, the guard member and cutter being mounted for lateral movement as a unit in a direction transverse to the cutter axis.

6. A machine for removing the rag from the half shell of citrus fruit, comprising: a feed wheel having a peripheral groove of semicircular cross section to conform to the exterior of a half shell of citrus fruit; a cutting disk adapted to fit within a half shell of citrus fruit and having teeth facing the direction of rotation of said wheel and disposed in said groove to define a semicircular channel for passage of a half shell of citrus fruit; means for rotating said cutting disk in a plane approximately coincident to the axis of said feed wheel; and a semicircular guard disposed in advance of said cutting disk and approximately conforming to the contour thereof.

7. A machine for removing the rag from the half shell of citrus fruit, comprising: a feed wheel having a peripheral groove of semicircular cross section to conform to the exterior of a half shell of citrus fruit; said feed wheel being formed of rubber-like yieldable material, the axial extremities of said wheel defining the sides of peripheral groove forming axially yieldable rims, axially flared end plates covering the extremities of said wheel to limit axial displacement of said rims; a cutting disk adapted to fit within a half shell of citrus fruit and having teeth facing the direction of rotation of said wheel and disposed in said groove to define a semicircular channel for passage of a half shell of citrus fruit; means for rotating said cutting disk in a plane approximately coincident to the axis of said feed wheel; and a semicircular guard disposed in advance of said cutting disk and approximately conforming to the contour thereof.

References Cited in the file of this patent

UNITED STATES PATENTS

| Number | Name | Date |
| --- | --- | --- |
| 501,404 | Brenner | July 11, 1893 |
| 1,370,634 | Dowson | Mar. 8, 1921 |
| 1,401,832 | Taylor | Dec. 27, 1921 |
| 1,512,410 | Eldridge | Oct. 21, 1924 |
| 1,631,854 | Carroll | June 7, 1927 |
| 1,970,274 | Brown | Aug. 14, 1934 |
| 2,212,925 | Polk, Sr. et al. | Aug. 27, 1940 |
| 2,309,328 | Polk Sr. et al. | Jan. 26, 1943 |
| 2,365,358 | Rector | Dec. 19, 1944 |
| 2,533,350 | Cahill | Dec. 12, 1950 |
| 2,562,818 | Polk, Sr. et al. | July 31, 1951 |

FOREIGN PATENTS

| Number | Country | Date |
| --- | --- | --- |
| 388,933 | Great Britain | Mar. 9, 1933 |